United States Patent

Berger et al.

[15] 3,643,235

[45] Feb. 15, 1972

[54] MONOLITHIC SEMICONDUCTOR MEMORY

[72] Inventors: Horst H. Berger, Sindelfingen; Sigfried K. Wiedmann, Esslingen, both of Germany

[73] Assignee: International Business Machines Corporation, Armonk, N.Y.

[22] Filed: Dec. 5, 1969

[21] Appl. No.: 882,575

[52] U.S. Cl...........................340/173 FF, 307/238, 307/279, 307/291

[51] Int. Cl.....................................G11c 11/40, H03k 3/281

[58] Field of Search..............................340/173 FF; 307/279

[56] References Cited

UNITED STATES PATENTS

| | | | |
|---|---|---|---|
| 3,535,699 | 10/1970 | Gaensslen | 340/173 FF |
| 3,541,530 | 11/1970 | Spampinato | 340/173 FF |
| 3,218,613 | 11/1965 | Gribble | 340/173 FF |
| 3,340,406 | 9/1967 | Kilby | 340/173 FF |
| 3,387,286 | 6/1968 | Dennard | 340/173 FF |
| 3,394,267 | 7/1968 | Schmidt | 307/218 |

*Primary Examiner*—Terrell W. Fears
*Attorney*—Hanifin and Jancin and James E. Murray

[57] ABSTRACT

This specification discloses a storage cell which employs inversely operated and transverse transistors to reduce storage cell size accessing times and power consumption when the cell is fabricated in monolithic form. Two cross-connected transistors are inversely operated so that they share a common emitter region with a separate base region and collector region for each of the cross-connected transistors. In this way, the transistors can be fabricated in a single diffusion region. The collector of each of the cross-connected transistors is connected to the collector of a load transistor of the opposite type transistor and to the base of an addressing transistor having its emitter connected to the sense line and its collector connected to the base of the load transistors. The two addressing and load transistors are formed in a single isolation zone with collector and base regions of the addressing transistors serving also as the base and collector regions respectively of the load transistors which are fabricated as transverse transistors with a common emitter region.

20 Claims, 13 Drawing Figures

INVENTORS
HORST H. BERGER
SIGFRIED K. WIEDMANN
BY James E. Murray
ATTORNEY

MONOLITHIC SEMICONDUCTOR MEMORY

BACKGROUND OF THE INVENTION

This invention relates to monolithic memories and more particularly to storage cells for such memories.

One common type of storage cell employs as its storage element a pair of cross-connected transistors with a resistor connecting the collector of each transistor to a source of power. This storage element is usually connected to the bit lines for the memory by other semiconductor elements for addressing that can be turned on or off by signals applied to word lines of the memory to respectively couple or isolate the storage element from the bit lines.

There are a number of difficulties with such a memory. One of these difficulties is that the resistances used as loads in such storage cells must be high resistance to assure low power consumption while the memory is not being accessed for reading or writing. However, as the impedance of a given resistor increases so does the space it takes up on the monolithic chip. Therefore the resistances used are usually a compromise between the desired high-resistance values and space conservation requirements.

Another consumer of chip space in the monolithic memory cells is isolation junctions between the elements of the cells. These junctions must be of some minimum surface width to provide proper electrical isolation for the elements of the cell. Therefore to assure proper electrical isolation of the cell again chip area must be sacrificed.

Besides the chip area and power consumption or dissipation consideration of the cell design the speed of operation of the cell is important. One factor effecting the speed at which the data can be read out of the storage cell is the speed at which the bit line capacitances can be charged by the output of the addressing semiconductor elements.

BRIEF DESCRIPTION OF THE INVENTION

Therefore in accordance with the present invention a new storage cell is provided which operates rapidly while consuming or dissipating very little energy and requiring very little chip area. One aspect of the invention is that the load devices are transistors of the opposite conductivity type with respect to the cross-coupled transistors and have their collectors connected to the collectors of the cross-coupled transistors. These load transistors do not take up anywhere near the amount of monolithic chip area as resistors with equivalent impedances and when these load transistors are properly biased they provide almost a perfect current source load for the cross-coupled transistors. Furthermore, with a slight change in their emitter potentials these load transistors can be made to change their current output considerably. The current source is an ideal load for the cross-coupled transistors while they are not being accessed.

Another aspect of the invention is that the addressing transistors for the cell have their bases connected to the collectors of the load devices and the cross-coupled devices while their emitters are connected to the bit lines of the memory and their collectors are connected to the bases of the load transistors. With this arrangement the two addressing transistors are formed in a single isolation zone with the collector and base regions of the addressing transistors also serving as the base and collector regions respectively of the load transistors which are fabricated as transverse transistors that share a common emitter region. This arrangement not only saves considerable chip real estate it also provides fast readout times since base to emitter junctions of the addressing transistors are voltage sources to rapidly charge the bit line capacitances.

A further aspect of the invention is that the cross-connected transistors of the storage cell are inversely operated transistors. This permits the cross-connected transistors to share a common emitter region with a base and collector region in it for each of the transistors. Thus there does not have to be a separate isolation zone for each of the cross-connected transistors.

The inversely operated transistors have a relatively low betas. However because of the high impedance of the load devices bistability can be maintained.

The three aspects of the invention when combined in a single cell provides a cell which operates rapidly while consuming little energy. Furthermore, as shall be seen in the described embodiments, the cell can be fabricated using a minimum of monolithic chip real estate.

Therefore it is an object of the present invention to provide a storage cell that can be fabricated in a very small area of a monolithic chip.

It is another object of the invention to provide a storage cell that consumes or dissipates very little energy; and it is a further object of the invention to provide a storage cell that operates rapidly.

DESCRIPTION OF THE DRAWINGS

These and other objects, features and advantages of the invention will be apparent from the following more particular description of the preferred embodiments of the invention as illustrated in the accompanying drawings of which:

FIG. 1 shows a directly cross-coupled transistor flip-flop which can be used as the basic component of a monolithic memory. The two cross-connected NPN-transistors T1 and T2 have their emitter electrodes connected together and to the potential V2 while their base and collector electrodes are cross-coupled. In the collector circuits of each of the transistors T1 and T2 there is a controllable load transistor 10 and 12 respectively. The controllable load transistors 10 and 12 are PNP-devices which have their emitters connected to the operating potential V1 and their collectors joined to the collectors of transistors T1 and T2. The third electrodes of transistors 10 and 20 are linked with a common terminal V*n*. When transistor T1 is conducting the potential at its collector or node A drops sufficiently to bias the base to emitter junction of transistors T2 off. With transistor T1 conducting the flip-flop stores a binary "0". Likewise when transistor T2 is conducting the potential at its collector or node B biases the base to emitter junction of transistor T1 off. With transistor T2 conducting the flip-flop stores a binary "1".

In FIGS. 2*a* and 2*b* it could be seen how the load transistors 10 and 12 are formed as two lateral PNP-transistors. Three P diffusions are made in an N epitaxial layer over an N+ subcollector diffused into a P— substrate prior to growth of the N epitaxial layer. Surrounding the P diffusion is a P+ isolation diffusion and N+ contact diffusion is made in the epitaxial layer within the isolation region after the P diffusions. Contacts are made to the P and N+ diffusions as illustrated and correspond to the similarly enumerated terminals in FIG. 1. Therefore the N epitaxial layer serves as the base of the two transistors 10 and 12 while the outer two P diffusions serve as the collectors of the transistors and the inner P diffusions serve as a common emitter of the two transistors. By means of an N+ subcollector diffusion the series resistance of the transistor base is reduced in a known manner. This is not absolutely essential for the operation of the invention. However where the subcollector is present and the P diffusion serving as the emitter reaches through to the subcollector there is a further advantage of the vertical injection being reduced and the lateral current amplification being increased.

Figure 2A:
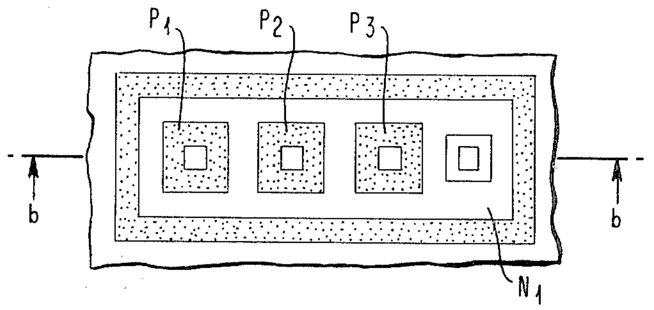
FIG. 2*a* is a plan view of an isolation region containing the lateral PNP-load-transistors of FIG. 1.
Figure 2B:
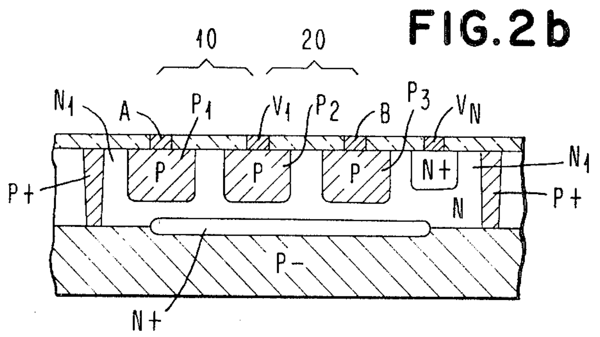
FIG. 2*b* is a section taken along line *b—b* in FIG. 2*a;*
Figure 3:
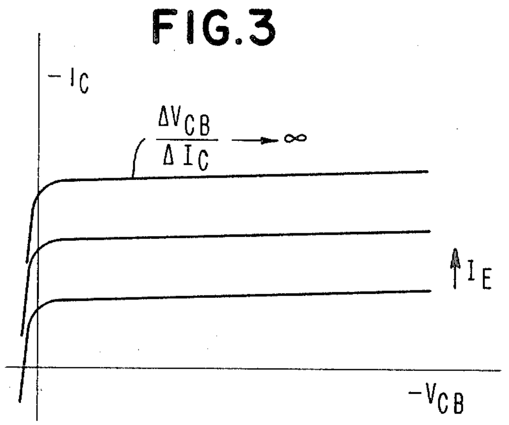
FIG. 3 is a characteristic curve for one of the load devices shown in FIG. 1.

The operating characteristics of the two elements 10 and 20 produced in accordance with FIGS. 2*a* and 2*b* are shown in FIG. 3. This figure depicts changes in the collector current *Ic* as a function of collector base voltage $V_{CB}$ for fixed emitter currents $I_E$ as the parameter. This results in a series of characteristics displaced in relation to each other and with the direction of the arrow indicating increasing values of the emitter currents. As can be seen the curves are relatively horizontal. This shows that the differential internal resistance $\Delta V_{CB}/\Delta <^{I}{}_{C}$ is very high so that the two transistors 10 and 20 each act as a current source.

Figure 1:
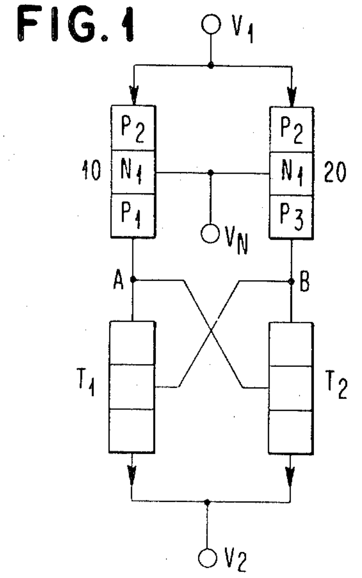
FIG. 1 is a schematic diagram of a flip-flop incorporating an aspect of the present invention.
Figure 4:
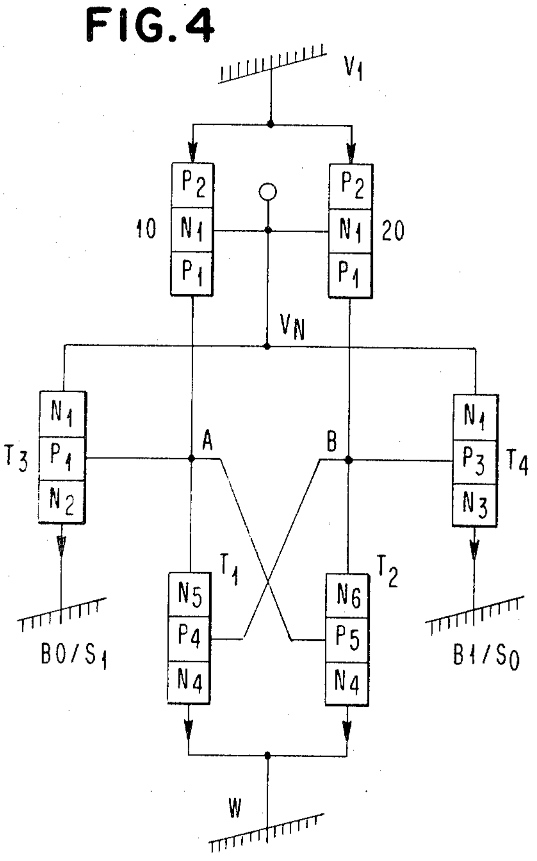
FIG. 4 is a schematic of a storage cell containing certain aspects of the applicant's present invention.

FIG. 4 shows a memory cell employing the flip-flop shown in FIG. 1. In addition to the flip-flop this memory cell includes two additional transistors T3 and T4 coupling the collectors of transistors T1 and T2 to the B0/S1 and B1/S0 bit lines respectively. The collectors of transistors T3 and T4 are connected together and to the bases of the devices 10 and 20 while the bases of transistors T3 and T4 are connected to the collectors of transistors T1 and T2 respectively. The emitter of transistor T3 is connected to the B0/S1 bit line and the emitter of transistor T4 is connected to the B1/S0 bit line.

While the storage cell is not being accessed for reading and writing the potential on the word line is maintained sufficiently low so that the potentials at nodes A and B bias transistors T3 and T4 off thus isolating the flip-flops from the bit lines B0/S1 and B1/S0. This permits bit line B0/S1 and B1/S0 to be used for operations involving other storage cells serviced by the bit lines B0/S1 and B1/S1 without disturbing the data stored in the flip-flop.

To read the data stored in the flip-flop, the potential on the word line is raised so that the transistor T3 or T4 with its base connected to the collector of the nonconducting transistor T1 or T2 conducts and provides an output signal on the B0/S1 or B1/S0 bit line. For instance, assume a "0" is in the storage cell and that transistor T1 is therefore conducting. Then, when the word line W potential is raised the node B increases sufficiently to cause the base to emitter junction of transistor T4 to conduct and place an output signal on the B1/S0 bit line. The transistor T3 is not biased conductive by this increase in word potential because the potential at node A is lower than at node B due to the saturation of transistor T1 and the potential difference between nodes A and B is sufficient to allow transistor T4 to conduct while transistor T3 is held off. In this connection it is not absolutely essential that the read transistors of the nonaddressed cells sharing the bit lines with the address cell be completely off. It is sufficient that the read current originating from the address cell exceeds the sum of the emitter currents from the other transistors T3 or T4 of other memory cells on the bit lines. By means of a differential amplifier the state of the cell can be accurately determined from the difference in the potentials or currents on the bit lines B0/S1 and B1/S0.

To write data into the storage cell, the word line W potential is again raised. Simultaneously the potential on one of the bit lines B0/S1 or B1/S0 is decreased causing the transistor T3 or T4 to conduct and reduce the potential at node A or node B until the transistor T1 or T2 with its base directly connected to the node is biased off and the other transistor is biased on. For instance, assume that a "0" is stored in the cell so that transistor T1 is therefor conducting and transistor T2 is to be rendered conducting to store a "1" in the storage cell. Then when the word line W potential is raised as during a read operation the potential on the B1/S0 bit line is reduced pulling the potential at node B down with it. This causes transistor T1 to conduct less and thereby start a regenerative action which results in the turning off of transistor T1 and the turning on of transistor T2. To write a "0", the B0/S1 bit line is lowered instead of the B1/S0 bit line when the word line W is raised. Furthermore, it makes no difference which transistor is conducting at the time the data is read in the cell. All that is necessary is that the proper bit line B0/S1 or B1/S0 be lowered.

Up until now the operation has been described as taking place as though V1 is maintained fixed on the flat portion of the curve during reading and writing just as it is while the storage cell is not accessed for reading and writing. However it should be apparent from FIG. 3 that the collector currents from the two PNP-transistors 10 and 20 can be controlled by changing the emitter current *Ie*. In turn the emitter current *Ie* is controlled over a wide range (about +60 mv. at a current ratio of 1:10) by means of slight voltage changes in V1. Thus the resistance of the cell can be made very low so that reading and writing of data in the cell can be accomplished rapidly with very low supply voltages. For example 2 volts in the case of Si technology. This results in very low power dissipation which can be regarded as a particular advantage.

Figure 5A:
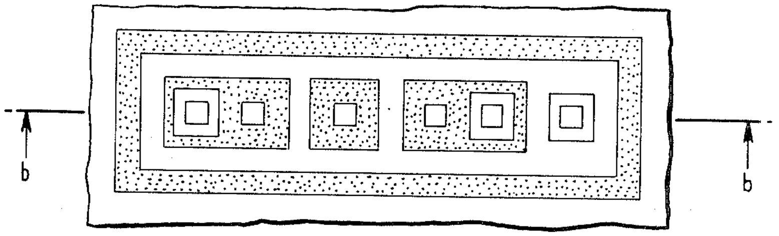
FIG. 5 is a plan view of a monolithic layout incorporating both the load devices and the addressing transistors for the storage cell shown in FIG. 4.
FIG. 5*b* is a section taken along lines *b—b* in FIG. 5*a;*
Figure 5B:
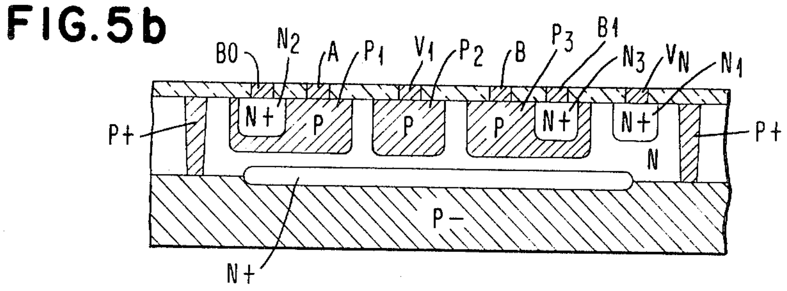

In FIG. 5 a monolithic layout of devices 10 and 12 and transistors T3 and T4 is shown. The layout is quite similar to the layout shown in FIG. 2. The difference between the two is that the outer P diffusions each contain an additional N+ diffusion converting these two diffusions into transistors T3 and T4. In FIG. 4 the transistors T3 and T4 and the devices 10 and 20 have been numbered to show which of the monolithic layers they correspond to. As can be seen the base of the vertical NPN-transistor T3 or T4 and collectors of the lateral PNP-transistor 10 or 20 are both formed by a single diffusion P1 or P3 respectively. While the collectors of T3 and T4 with the bases 10 and 20 are all formed by the epitaxial layer. Thus, the surprisingly small layout of FIGS. 5*a*, 5*b* includes all four elements and their interconnections. As will be explained hereafter, it is possible to omit parts of the isolation diffusions when using the present memory cell in a memory matrix. In such a case it may be sufficient to carry out only once the contacts of the N-epitaxial layer at $V_N$ for a number of memory cells. Furthermore, the subcollector, the highly doped N+ area in FIG. 5*c* is not absolutely necessary.

Figure 6A:
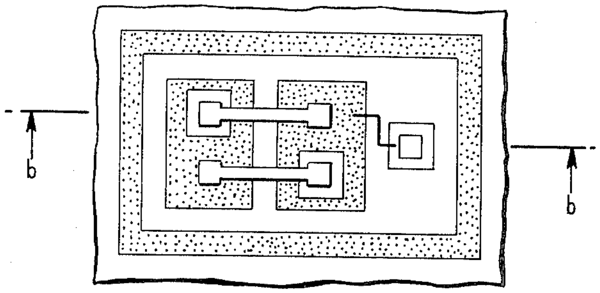
FIG. 6*a* is a plan view of a monolithic layout for the cross-connected transistors of the storage cell of FIG. 4.
Figure 6B:
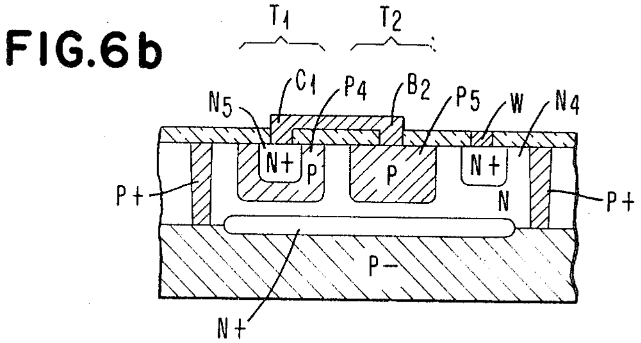
FIG. 6*b* is a section taken along line *b—b* in FIG. 6*a;*

The layout of the cross-connected transistor T1 and T2 and their interconnections are shown in FIG. 6. As the two transistors have different collector potentials, it generally requires two isolation pockets to realize them as standard vertical NPN-transistors. However, the two transistors required for the above circuit are carried out in one isolation pocket, as shown in FIGS. 6*a*, 6*b* by using the N-epitaxial layer N4 to form the common emitters of the two transistors. This N-epitaxial layer then also constitutes the word line W connected to the memory cell. The bulk resistance of the epitaxial layer can be reduced by means of a highly doped subcollector. The N+ collector areas, which is normally operated vertical transistors would be used as the emitter zones, are diffused into the two P-base diffusions. Cross-coupling is realized by metallization between C1 and C2. In FIG. 4 the transistors T1 and T2 have been numbered to show which layers of the monolyte they correspond to in FIG. 6.

The current amplification of the inverse transistors T1 and T2 is not as high as regular transistors. However, it is sufficient for the cell to be operated above the stability limit, in addition to offering the advantage of the two transistors T1, T2 being arranged within one isolation pocket with minimum space requirements. As will be explained hereafter, it is possible to manufacture several such transistor pairs in one isolation pocket.

The stability limit, or the lowest current at which the cell is capable of retaining information, is essentially given by the emitter current of the cross-coupled transistors, at which the current amplification Beta drops to one. It is important in this context that the differential load resistance of the elements 10, 20 is almost infinitely high since it permits the use of inverse transistors with very low betas.

Figures 7, 8:
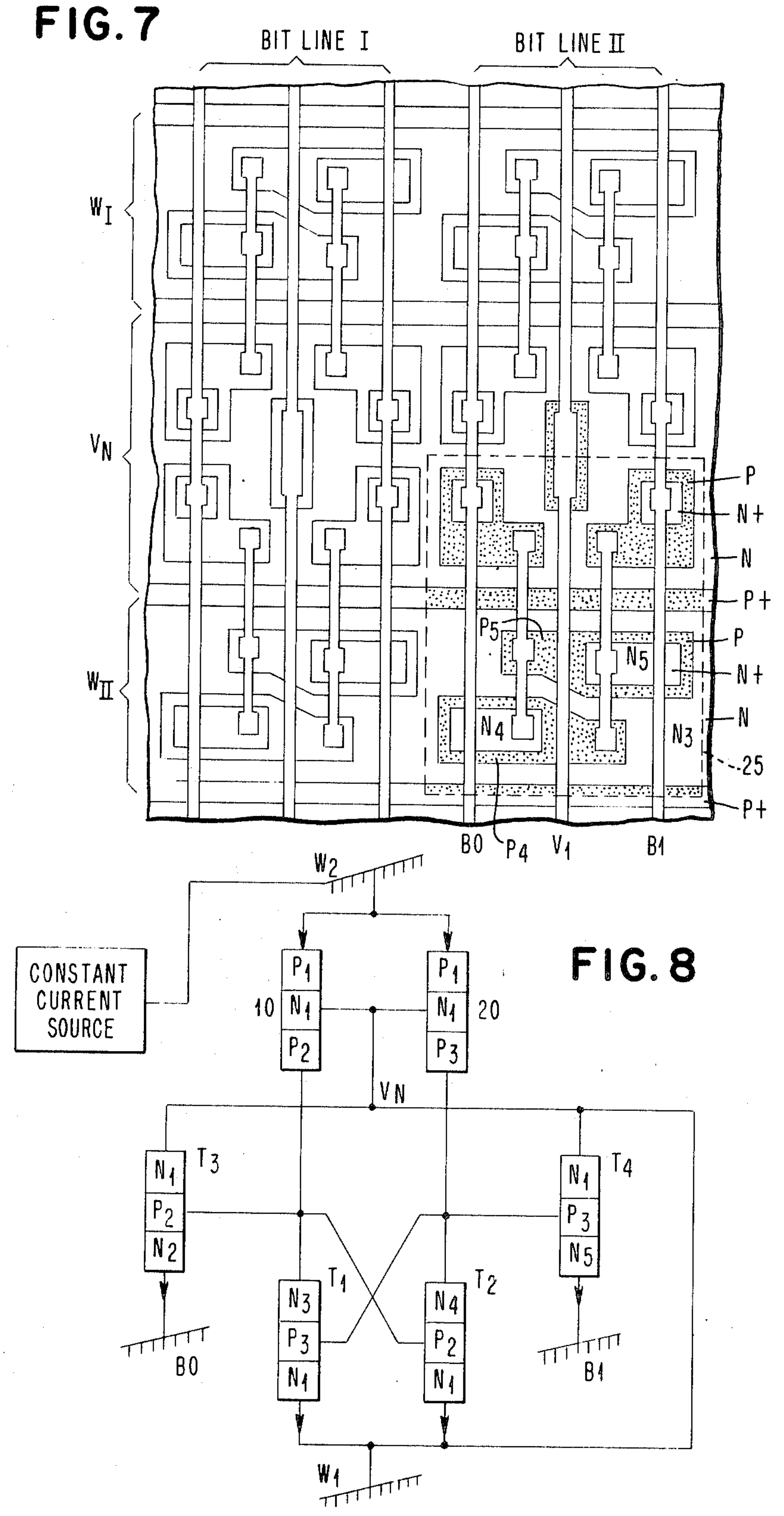
FIG. 7 is a layout for a number of storage cells of the type shown in FIG. 4 arranged in a memory matrix.
FIG. 8 is an alternative form for the storage cell in accordance with the present invention.

In FIG. 7 some of features of the present invention discussed in conjunction with FIGS. 5 and 6 are carried further in the design of a memory matrix to further decrease the area the cell takes upon a monolithic chip. In this figure, memory cells such as 25 are arranged at the word and bit line crossings. Metallizations for a bit line pair B0/S1 and B1/S0 are arranged vertically together with a metallization for the supply voltage line VI. Word line W1 extends horizontally in the subcollector or the epitaxial layer of the isolation pocket housing the cross-coupled transistors. All the cross-connector transistors T1 and T2 in one word line are thus arranged in a single horizontal isolation zone. Between each two horizontal zones containing the cross-connector transistors T1 and T2 for two word lines there is a third isolation zone containing the transistors T3, and T4 and the lateral PNP-transistors 10 and 20 for both word lines. Therefore as can be seen from the layout, all cross-connected transistors common to one word are arranged within one isolation zone and a second zone between two word lines houses the address T3 and T4 and load 10 and 20 transistors for the two adjoining words.

The cross-coupling and connection of the circuit components of FIGS. 5 and 6 are accomplished by means of metallizations. In a layout for memory cells in accordance with FIG. 4, the operating voltage supply V1 can either be arranged parallel in relation to the word line W or the bit lines B0/S1 B1/S0. In the present embodiment the metallization for the voltage supply V1 extends parallel to the bit lines. This has the advantage that the series bulk resistances of the word lines formed by the epitaxial layer do not interfere, and that line crossings are therefore eliminated. The various layers of the monolithic chip have been numbered here to show their corresponding function on FIG. 4.

FIG. 8 shows a further simplification that can be made if V2=VN. Normally VN is larger than V2. However, it is possible to operate the cell when they are equal. In this case, a connection can be made between the emitters of transistors T1 and T2 and the collectors of transistors T3 and T4 as the circuit in FIG. 8 shows. Therefore, the six transistors can be realized in eight doping zones in a single isolation zone. The operation of this cell is identical to the cell of FIG. 4 except the V1 terminal must be raised with the V2 terminal to assure proper operation. This can be accomplished by using a current source for supplying V1 to all cells of a word line. Bilevel powering can be implemented with this scheme by using two different level current sources to supply V1.

Figure 9A:
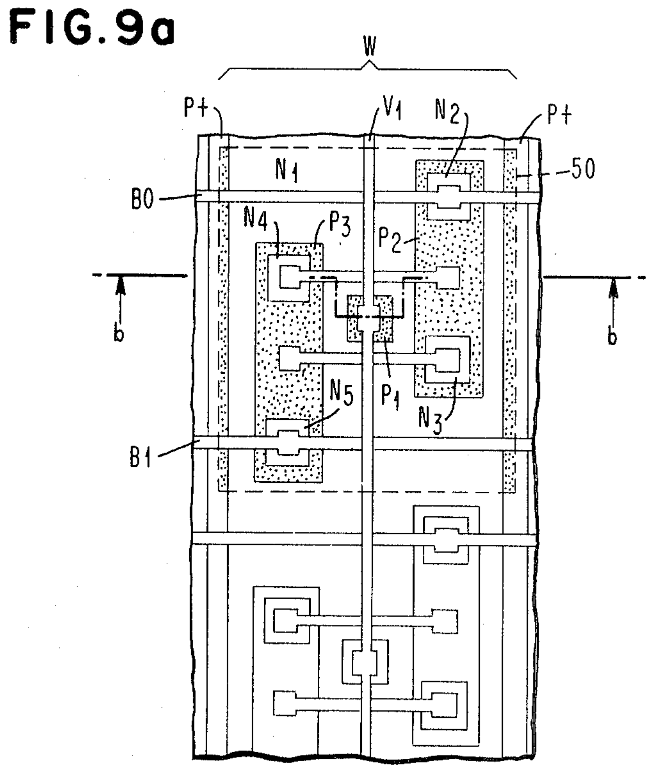
FIG. 9*a* is a monolithic layout for a storage cell shown in FIG. 8.
Figure 9B:
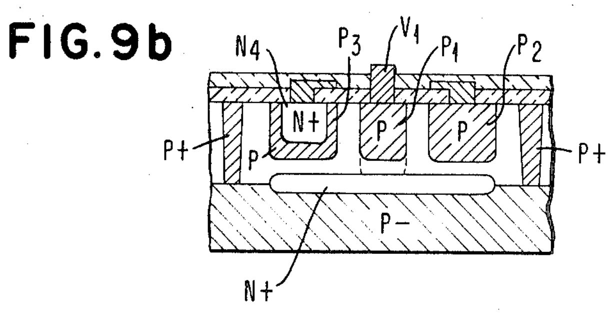
FIG. 9*b* is a section taken along lines *b—b* in FIG. 9*a*.

FIG. 9*a* shows a layout of a memory matrix using the memory cell of FIG. 8. The designations of the individual diffusion zones correspond to those in FIG. 8 and a complete cell is shown within the dotted box 50. The sectional view in FIG. 9*b* shows that the bit line pairs B0/S1, B1/S0 and the voltage line V1 are realized by double-layer metallization separated from each other by a layer of oxide insulation. The center P1 diffusion can also be diffused as a highly doped P+ diffusion together with the isolation diffusion. Short circuiting with the P-substrate is avoided by a blocked PN-junction over the N+ subcollector. The word line W, connected to the epitaxial potential, extends vertically in relation to the bit lines in the epitaxial layer and the highly doped subcollector respectively.

The arrangement consists in a further reduction in the surface area required on the monolithic chip. Additionally, there is the advantage of the reduction in the number of contacts per cell from nine to seven. Therefore since most of the breakdowns occurring in orthodox semiconductors are caused by faulty contacts, rather than by changes in the crystal properties, the cell reliability is improved at a ratio of 9:7. Furthermore if discrete components were soldered in accordance with FIG. 4 some 20 soldering operations would be required. This, too, bears out the technical progress inherent in the present invention.

By control of potential V1 memory cells of this invention can be employed in the memory matrix for different modes of operation. Here are the possibilities:

a. constant power, i.e., constant cell current by maintaining V1 fixed;

b. changing between two current levels, i.e., increasing the power of an addressed cell over that available in the standby state by supplying a higher V1 during reading and writing;

c. completely setting off the nonaddressed cells for a certain discharge time during which the information is retained by turning V1 off intermittently.

Moreover, it is possible to use combinations of the above techniques in a memory such as, for example, raising the power level only for the cells of a bit or word.

The two advantages offered by the memory cell in accordance with the invention are: low power requirements in the standby state to prevent overheating, and low space requirements by eliminating both isolation diffusions and other diffusions. It is these very characteristics which are essential for solving the problem of high integration density, so that high information densities are obtained on small semiconductor chips. A further advantage consists in the possibility of varying the cell current over a wide range by means of the active semiconductor devices 10, 20 serving as a current source, without essentially changing the cell voltage since extremely small changes in V1 will bring about this result.

Summarizing, it can be said that in terms of current bipolar memory techniques an arrangement in accordance with the invention, with regard to efficiency and space requirements, is superior to any of the orthodox semiconductor memories. It is very doubtful whether orthodox technology in comparison with the layouts as shown permits essential reductions in the size of a memory matrix. These advantages result among others from merging components and adopting an advantageous conductor and crossing pattern. A further advantageous feature consists in the elimination of ohmic resistances in the memory matrix, which require significant amounts of space.

While the invention has been shown and described with reference to a preferred embodiment thereof it will be understood by those skilled in the art that various changes in form and details may be made therein without departing from the spirit and scope of the invention.

What is claimed is:

1. In a memory cell having a pair of cross-coupled bipolar transistors each connected by a load impedance to a source of potential, the improvement comprising a separate load impedance transistor of the opposite conductivity kind from the cross-coupled transistors connecting the collector of each of the cross-coupled transistors to the source of potential with the collectors of the load impedance transistors connected to the collectors of the cross-connected transistors and the emitters of the load impedance transistors connected to the source of potential, and a separate addressing transistor with its base connected to the collector of each of the cross-connected transistors, its emitter connected to a bit line servicing the memory cell and its collector connected to the bases of the load transistors.

2. The memory cell of claim 1 wherein said load impedance transistors are lateral transistors.

3. The memory cell of claim 1 wherein said cross-connected transistors are formed in a common emitter zone.

4. The memory cell of claim 1 wherein the bases of the load transistors and the collectors of the addressing transistors are connected together and to the emitters of the cross-connected transistors.

5. The memory cell of claim 1 wherein said load impedance transistors are lateral transistors and said addressing transistors are vertical transistors.

6. The memory cell of claim 5 wherein said load impedance transistors and said addressing transistors are formed in a single isolation zone of one conductivity type which serves as the collector of the addressing transistors and the bases of the load impedance transistors;

two zones of opposite conductivity type are positioned in that isolation zone and serve as bases of the addressing transistors and the collectors of the load impedance transistors;

a zone of the first conductivity type is located in each of the zones of the opposite conductivity type and serve as the emitters for the addressing transistors; and a third zone of the opposite conductivity type which serves as the common emitters of the two load impedance transistors.

7. The memory cell of claim 6 wherein said cross-connected transistors are formed in a common emitter zone of one conductivity type.

8. The memory cell of claim 6 wherein said common emitter zone has therein two base zones of opposite conductivity type each of which in turn contain a collector zone of the said one conductivity type.

9. A monolithic memory comprising:

a first plurality of parallel isolation zones each containing a plurality of cross-connected transistors with each said parallel diffusion serving as the emitter zone of all the transistors in the diffusion;

a second plurality of parallel isolation zones with individual ones of said second plurality positioned between each two of said first plurality and containing load devices for each of the cross-connected transistors; and metallization means connecting the load transistors to the collectors of the cross-connected transistors.

10. The monolithic memory of claim 9 wherein each isolation zone in the second plurality contains the load transistors for the cross-connected transistors contained in the isolation zones of the first plurality on both sides of it.

11. The monolithic memory of claim 10 wherein said second plurality of parallel isolation zones contains addressing transistors for coupling the collectors of the cross-connected transistors to bit lines for accessing the memories.

12. The monolithic memory of claim 11 wherein:

said second isolation zone is of one conductivity type and serves as the collectors of all the addressing transistors and the bases of all the load transistors therein.

13. The monolithic memory of claim 12 wherein:

two zones of the opposite conductivity type are positioned on each of the second isolation zones for all the load transistors and addressing transistors serving each pair of cross-connected transistors and serves as the bases of the addressing transistor and the collectors of the load transistors;

a zone of the first conductivity type is located in each of the two zones of the opposite conductivity type and serve as the emitters for the addressing transistors; and a third zone of the opposite conductivity type serving as the common emitters of the load transistors.

14. In a memory cell having a pair of cross-connected transistors each having their collectors connected to a source of potential by a load and having their emitters connected together, the improvement comprising a separate load transistor connecting the collector of each of the cross-connected transistors to the source of potential with the base of load devices being connected to the emitters of the cross-connected devices.

15. The memory cell of claim 14 wherein the collectors of the load devices are connected to the collectors of the cross-connected devices and the emitters of the load transistors are connected to the source of potential.

16. The memory cell of claim 15 including a separate addressing transistor with a base connected to the collector of each of the cross-connected transistors, an emitter connected to a bit line servicing the memory cell and a collector connected to the bases of the load transistors.

17. The memory cell of claim 16 wherein said load transistors are lateral transistors and said addressing transistors are vertical transistors.

18. A monolithic memory cell comprising:

a zone of one conductivity kind serving as the emitters of two transistors with their bases and collectors cross-connected, as the collectors of two address transistors for coupling the monolithic memory cell to bit lines for addressing the memory cell and as the bases of two transistors acting as loads to the cross-connected transistors, and two zones of opposite conductivity kind within the first mentioned zone each serving as the base of one of the transistors whose bases and collectors are cross-connected, as the base of one of the address transistors and as the base of one of the transistors serving as a load to one of the cross-connected transistors.

19. The memory cell of claim 18 including: cross-connected a third zone of opposite conductivity kind in the first-mentioned zone, said third zone of opposite conductivity kind serving as the emitters of the two transistors serving as load devices for the cross-connected transistors.

20. The memory cell of claim 19 including:

two zones of the first conductivity kind in each of said two zones of the opposite conductivity kind one of said zones of the first conductivity kind in each of said two zones of opposite conductivity kind being the collector of one of the transistors with their collectors and emitters cross-connected and the other zone of the first conductivity kind in each of said two zones of opposite conductivity kind being the emitter one of the addressing transistors.

* * * * *